United States Patent
Baker

(10) Patent No.: US 9,840,178 B2
(45) Date of Patent: Dec. 12, 2017

(54) SOFT-SIDED RECEPTACLE WITH RESTRAINT MEANS FOR EXTERNAL LINER

(71) Applicant: Ross Baker Consulting Co. Inc., Byron Center, MI (US)

(72) Inventor: Ross Baker, Byron Center, MI (US)

(*) Notice: Subject to any disclaimer, the term of this patent is extended or adjusted under 35 U.S.C. 154(b) by 0 days.

(21) Appl. No.: 15/291,306

(22) Filed: Oct. 12, 2016

(65) Prior Publication Data

US 2017/0029206 A1 Feb. 2, 2017

Related U.S. Application Data

(60) Provisional application No. 62/277,877, filed on Jan. 12, 2016.

(51) Int. Cl.
  *B65D 30/08* (2006.01)
  *B60N 3/08* (2006.01)
  (Continued)

(52) U.S. Cl.
  CPC ............... *B60N 3/08* (2013.01); *B65F 1/002* (2013.01); *B65F 1/0006* (2013.01); *B65F 1/06* (2013.01);
  (Continued)

(58) Field of Classification Search
  CPC ........ B65F 1/065; B65F 1/0006; B65F 1/002; B65F 1/06; B65F 1/1468; B60N 3/08
  (Continued)

(56) References Cited

U.S. PATENT DOCUMENTS 2,577,670 A * 12/1951 Adams .................... A45C 3/00
                                                                190/111
2,798,650 A * 7/1957 Durham .................. B60N 3/08
                                                                224/483
(Continued)

OTHER PUBLICATIONS

Put a hook on the side of the trash can to keep the liner in place. Acquired on Aug. 31, 2016 Link: http://www.bkgfactory.com/01/05/put-a-hook-on-the-side-of-the-trash-can-to-keep-the-liner-in-place-i-started-doing-this-a-month-ago-and-it-works-perfectly-the-bag-doesnt-fall-in-and-the-command-hooks-stay-in-place/.
(Continued)

*Primary Examiner* — Jes F Pascua
(74) *Attorney, Agent, or Firm* — Reem Allos

(57) ABSTRACT

A soft-sided portable receptacle for use in vehicles, or elsewhere, having a leak proof interior liner and structural support. The receptacle having a reinforced upper rim portions to allow for closure of the receptacle using a closure means. The waste receptacle having foldable reinforced side rims to allow for folded or expanded configuration. The soft-sided receptacle having fastener means attached to the exterior of the receptacle intended to fasten an external disposable plastic liner within the interior of the receptacle. The soft-sided portable receptacle may be comprised of a downward facing hook or clip, or alternative fastener mechanisms. The fastener mechanism configured along the exterior perimeter of the receptacle may be removable, rotatable, and permits height adjustment to retain disposable plastic liners of varying sizes. The soft-sided portable waste receptacle may be of varying shapes and sizes, having exterior fastener means attached on opposite sides of the receptacle.

3 Claims, 12 Drawing Sheets

(51) Int. Cl.
  *B65F 1/00* (2006.01)
  *B65F 1/06* (2006.01)
  *B65F 1/14* (2006.01)
(52) U.S. Cl.
  CPC ...... *B65F 1/1468* (2013.01); *B65F 2001/061* (2013.01)
(58) Field of Classification Search
  USPC .......... 383/111, 113, 33, 6, 13, 15, 22–24; 220/495.11, 495.08, 495.1; 248/99–101
  See application file for complete search history.

(56) References Cited

U.S. PATENT DOCUMENTS

| | | | | |
|---|---|---|---|---|
| 2,830,748 | A * | 4/1958 | Faltin | B60N 3/08 224/547 |
| 4,724,791 | A * | 2/1988 | McSorley | B63B 17/00 114/343 |
| 4,810,102 | A * | 3/1989 | Norton | A45C 1/04 150/108 |
| 4,917,160 | A * | 4/1990 | Hart | A45C 3/00 150/106 |
| 4,961,522 | A * | 10/1990 | Weber | A45C 3/00 190/119 |
| 4,976,352 | A * | 12/1990 | Nordstrom | A45C 3/00 206/316.2 |
| 5,226,576 | A * | 7/1993 | Ellsworth | B60R 7/043 224/275 |
| 5,362,153 | A * | 11/1994 | Lu | B60N 3/08 220/495.06 |
| 5,645,186 | A | 7/1997 | Powers et al. | |
| 5,927,800 | A * | 7/1999 | Stallworth | A47C 7/56 297/188.08 |
| 6,626,337 | B1 * | 9/2003 | Cox | B60N 3/08 224/275 |
| 6,644,063 | B2 | 11/2003 | Mogil | |
| 6,991,373 | B2 * | 1/2006 | Carr | A61J 19/00 220/495.11 |
| 7,770,952 | B2 | 8/2010 | Hanzel | |
| 8,061,159 | B2 | 11/2011 | Mogil et al. | |
| 8,376,200 | B2 * | 2/2013 | Kim | B60R 11/00 224/275 |
| 8,540,106 | B2 | 9/2013 | Banus | |
| D716,717 | S | 11/2014 | Swartzel et al. | |
| 9,156,590 | B2 * | 10/2015 | Colayco | B65D 65/466 |
| 2004/0206430 | A1 * | 10/2004 | Chang | A45C 3/06 150/110 |
| 2008/0128460 | A1 | 6/2008 | Adler et al. | |
| 2008/0205798 | A1 * | 8/2008 | Bickley | A45C 3/06 383/11 |

OTHER PUBLICATIONS

Google Images Text: side hooks to keep liner trash. Acquired on Aug. 31, 2016 Link: https://www.google.com/search?q=side+hooks+to+keep+liner+trash&biw=1366&bih=643&source=lnms&tbm=isch&sa=X&ved=0ahUKEwjMgbCnhJDPAhXD7oMKHQS1AeoQ_AUIBygC.
Google Images Text: side hooks to keep liner in place. Acquired on Aug. 31, 2016 Link: https://www.google.com/search?q=side+hooks+to+keep+liner+trash&biw=1366&bih=643&source=lnms&tbm=isch&sa=X&ved=0ahUKEwjMgbCnhJDPAhXD7oMKHQS1AeoQ_AUIBygC#tbm=isch&q=side+hooks+to+keep+liner+in+place.
Amazon.com Listing: Tech Zone 2-in-1 Car Organizer: Acquired on Aug. 31, 2016 Link: https://www.amazon.com/Zone-Tech-Organizer—Practical-Dispenser/dp/B00ZAS2D7U/ref=sr_1_3?e=UTF8&qid=1473896722&sr=8-3&keywords=tech+zone+2+in+1.
Amazon.com Listing: Lebogner Car Garbage Can. Acquired on Aug. 31, 2016 Link: https://www.amazon.com/Car-Garbage-Can-Cover-Lebogner/dp/B016AOLKOE/ref=sr_1_2?e=UTF8&qid=1473896823&sr=8-2&keywords=car+garbage+can+lebogner.
Amazon.com Listing: High Road Organizers TrashStash. Acquired on Aug. 31, 2016 Link: https://www.amazon.com/High-Road-TrashStash-Leakproof-Hanging/dp/B009FREAGO/ref=sr_1_1?e=UTF8&qid=1473896967&sr=8-1&keywords=high+road+trash+can.
Amazon.com Listing: High Road Organizers TrashStand. Acquired on Aug. 31, 2016 Link: https://www.amazon.com/High-Road-TrashStand-Leakproof-Weighted/dp/B000ETQMIQ/ref=sr_1_2?e=UTF8&qid=1473897040&sr=8-2&keywords=high+road+trashstand.
Amazon.com Listing: EPAuto Trash Can. Acquired on Aug. 31, 2016 Link: https://www.amazon.com/EPAuto-Waterproof-Leakproof-Litter-Pocket/dp/B017RX7GWW/ref=sr_1_1?e=UTF8&qid=1473897150&sr=8-1&keywords=epauto+trash+can.

* cited by examiner

SOFT-SIDED RECEPTACLE WITH RESTRAINT MEANS FOR EXTERNAL LINER

FIELD OF THE INVENTION

This invention relates to portable soft-sided receptacles used as storage bins or waste receptacles. Specifically, the invention is a soft-sided receptacle having side clasps to secure an exterior disposable liner.

BACKGROUND

A variety of portable soft-sided receptacles exist for transporting items while in transit, but unfortunately, items within the receptacle shift during transport resulting in mixing of the contents and sometimes, accidental rupture of contents of items stored in the receptacle, which ultimately leads the consumer to have to clean the receptacle manually after usage. Other portable soft-sided receptacles allow a user to utilize an external disposable liner to reduce the amount of clean-up of items accidentally rupture during transport. However, these external disposable liners are not secured, move around and collapse downward during transport despite being in the receptacle, resulting in a limited efficiency of their usage.

Concerning waste receptacles, a variety of vehicle waste receptacles exist for collection of solid and liquid waste within vehicles. For example, it is known in the art to hang a portable soft-side waste receptacle along a passenger side seat back to dispose of waste within a vehicle. There are multiple manufacturers of soft-sided waste receptacles, each with having a different design and offering differing functionality to their customers. However, the existing portable soft-sided trash receptacles cannot maintain disposable liners in a fixed position once the liner is placed in the receptacles. Also, some portable receptacle models are too small or too large for grocery bag disposable liners to be re-used inside the waste receptacle, leaving the consumer with no other choice but to directly toss waste into the inner portion of the receptacle. In most cases, a manufacturer has designed a soft-sided portable waste receptacle without contemplating the use of an exterior liner, but rather allow waste to be directly tossed into the receptacles. Receptacles without liners degrade much more quickly over time because the user is constantly washing the inner surface to remove odor and waste residue, resulting in subsequent re-order of the receptacle product. Additionally, some portable receptacle models cannot close the top opening, allowing odor and unsightly waste to remain in the receptacle in the presence of children and vehicle guests. Also, the soft-sided waste receptacles cannot accommodate extra-large waste or small compartments within the vehicle. Moreover, the majority of soft-sided waste receptacles do not offer alternative means of attachment other than the hanging strap. Lastly, some models of soft-sided waste receptacles do not offer a means to store disposable liners. Thus, the consumer when deciding to purchase a soft-sided waste receptacle does not have all their needs met, and are left with much to be desired.

SUMMARY

The device and method of the disclosure each have several innovative aspects, no single one of which is solely responsible for the desirable attributes disclosed herein.

In one inventive aspect, a receptacle having a soft-sided open top container is provided. The receptacle device includes a container having an interior structure and exterior structure. The interior structure is having a leak proof permanently affixed liner. The exterior structure having at least one fastener means attached along the perimeter of the exterior structure to secure a disposable liner. The fastener means to the exterior structure of the container may be a downward facing hook. The fastener means to the exterior structure of the container may be a downward facing clip. The receptacle configured to retain a single disposable liner; wherein the disposable liner has at least one handle attached to the at least one fastener means. The fastener means may be configured to be removably attached to a decorative strap along the perimeter of the exterior structure of the soft-sided container. The fastener means may be configured to be rotatably attached to a to decorative strap along the perimeter of the exterior structure of the soft-sided container.

In another inventive aspect, a receptacle to restrain a disposable liner. The receptacle is a soft-sided open top container having an interior structure and an exterior structure. The interior structure is having a leak proof permanently affixed liner. The exterior structure is having two fastener means, each of which is attached at opposite ends of the exterior structure to secure at least two disposable liner handles of the disposable liner. The fastener means configured along the exterior structure may be a downward facing hook. The fastener means configured along the exterior structure may be a downward facing clip. In one embodiment, the downward facing clip may require a user to apply upward pressure to insert at least one of the at least two disposable liner handles within each of the two fastener means. Also, each of the two fastener means may be configured to be removably attached to a decorative strap along the perimeter of the exterior structure of the soft-sided container. Moreover, each of the two fastener means may be configured to be rotatably attached to a to decorative strap along the perimeter of the exterior structure of the soft-sided container to allow the removal and rotation of each of the at least two fastener means. Also, each of the two fastener means may be placed at differing elevations along the exterior structure of the container to permit the proper restraint of varying sizes of the disposable liners. The receptacle may have a lid attached to the exterior structure configured to rest in a vertical configuration during non-usage and flippable into a horizontal configuration covering an open top side of the container during usage.

In another inventive aspect, a method of retaining a removable liner within a soft-sided receptacle. The method encompassing (1) inserting the removable liner within an internal structure of the receptacle; (2) lifting at least two liner handles, on opposite sides of the receptacle, above an opening within the receptacle; (3) folding the at least two liner handles downward, on opposite sides, towards at least two side clasps, each of the at least two side clasps configured along opposite ends of an outer soft-sided structure of the receptacle; and (4) attaching the at least two liner handles, on opposite sides, along the at least two side clasps in order to restrain the removable liner. The method further encompassing: (5) removing of the at least two liners handles, on opposite sides, attached to each of the two side clasps by applying a gentle amount of downward pressure to dis-attach the two liner handles from the at least two side clasps. The at least two side clasps may not be not directly attached to the outer structure of the receptacle, and are attached to straps sewn into the outer soft-sided structure of the receptacle. Also, folding the at least two liner handles downward requires that the liner handles are folded below the at least two clasps and upward pressure applied to insert the two liner handles within the at least two side clasps. The two side clasps may be downward facing hooks or clips.

BRIEF DESCRIPTION OF DRAWINGS

These and other features will now be described with reference to the drawings summarized below. These drawings and the associated description are provided to illustrate a preferred embodiment of the invention, and not to limit the scope of the invention.

DETAILED DESCRIPTION

Figure 1:
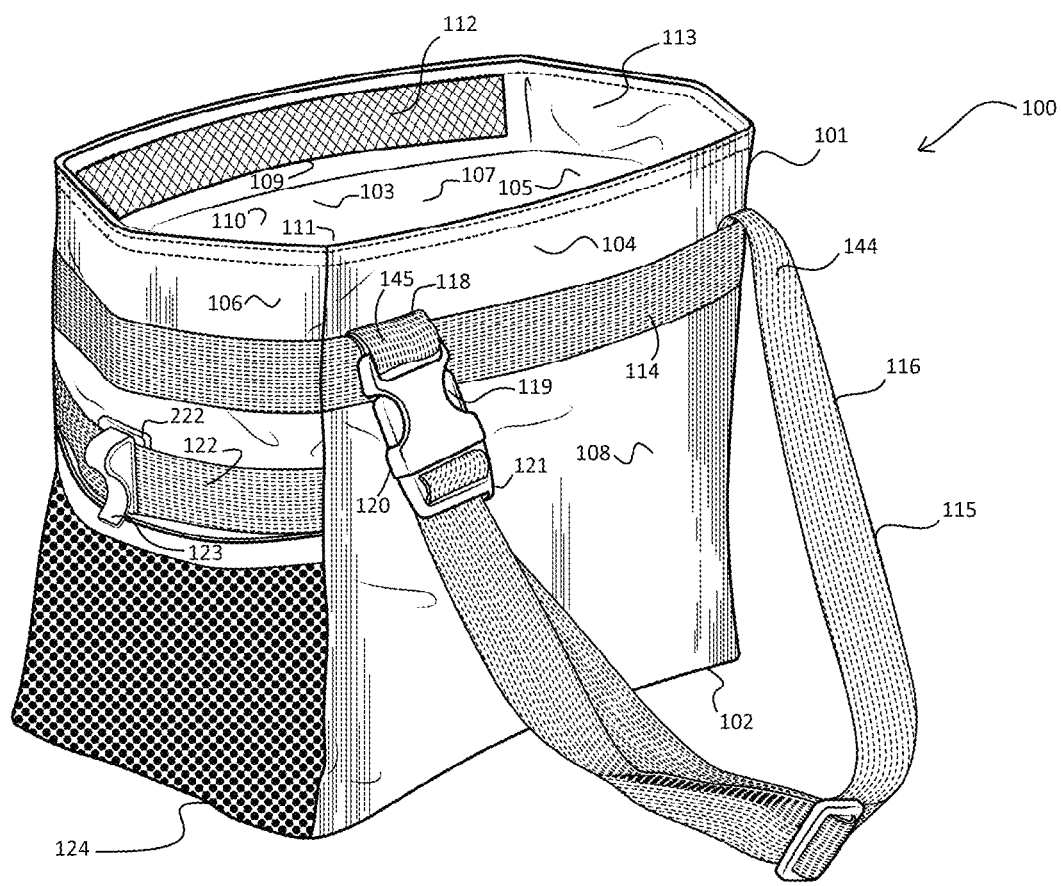
FIG. 1 is a back perspective view of a receptacle according to one embodiment of the disclosure.

One non-limiting advantage of the described soft-sided waste receptacle is the ability to maintain a disposable liner securely within an inner portion of a receptacle because the liner holders are attached to fastener means (clips, hooks, clasps, etc.) on opposite ends alongside the exterior lining of the receptacle. As a result, the consumer does not need to invest much time and effort in the cleaning of the interior portions of the receptacles, as it should be kept clean due to the use of the disposable liner. Moreover, because the consumer is not disposing of items or waste directly into the receptacle, but rather in an exterior liner, there is likely less odor and waste residue remaining once a disposable liner is disposed of properly.

Another non-limiting advantage of the soft-sided receptacle is that the receptacle is of a perfect size to fit a general size plastic grocery bag having two handles. The receptacle can be enlarged to fit larger disposal or container needs, and custom liners may be designed to fit a larger receptacle.

Another non-limiting advantage of the soft-sided receptacle is that the receptacles can be closed along the top opening by bringing opposite sides of the receptacle together and enabling a closure means (snaps, zipper, hook and loop, button, etc.) to join the two opposite sides together.

Another non-limiting advantage of the soft-sided receptacle is that it provides alternative means of attachment, other than by use of the hanging strap. One means of attachment contemplated by the disclosure is the use of an external stick-on safety-pin having an adhesive side for which to attach to an external surface or the exterior of the receptacle. An alternative means of attachment contemplated by the disclosure is the use of a stick-on loop and hooks strips for which to attach to an external surface or the exterior of the receptacle.

Another non-limiting advantage of the soft-sided receptacle is that it provides reinforced foldable side rims which permit the receptacle to be collapsed inward to accommodate smaller spaces within a vehicle or elsewhere, and also expanded outward to accommodate extra large storage needs by the consumer.

The description that follows, and the embodiments described therein, are provided a way of illustration of an example, or examples, of particular embodiments of the principles of the present invention. These examples are provided for explanation, and not of limitation, of those principles and the invention. In the description, like parts are marked throughout the specification and the drawings with the same respective reference numerals. The drawings are not necessarily to scale and in some instances proportions may have been exaggerated in order to more clearly depict certain features of the disclosure.

100 receptacle
101 container
102 bottom wall
103 front wall
104 back wall
105 first side wall
106 second side wall
107 interior structure
108 exterior structure
109 upper fastener portion
110 lining
111 leak proof interior liner
112 closure mechanism
113 foldable reinforced side rims
114 perimeter decorative sewed strap
115 hanging strap
116 long-end strap
117 length adjustment harness
118 short-end strap
119 long strap buckle end
120 short strap buckle end
121 integrated length adjustment harness
122 side decorative sewed strap
123 fastener means
124 mesh pocket
125 thermal insulation
126 lid
127 first loop and hook strip
128 second loop and hook strip
129 lid clasps
130 exterior liner
131 liner handle
132 front lower magnet 133 back upper magnet
134 stiff bottom plate
135 back upper iron piece
136 magnet tab
137 rigid spines
138 reinforced front wall rims
139 reinforced back wall rim
140 soft-sided exterior lining
141 stick on safety-pin
142 lid tab
143 open top of container
144 long strap fixed end
145 short strap fixed end
146 lid front side
147 lid back side
148 interior lid pocket
149 rigid plastic wall
222 fastener means harness
224 decorative strap
225 top decorative strap
226 lower decorative strap FIG. 1 illustrates an exemplary embodiment of a soft-sided waste receptacle with side clasps. In one embodiment of the disclosure, the receptacle 100 may be comprised of a container 101 having an interior structure 107 and an exterior structure 108. The exterior structure 108 defines the exterior decorative and functional features of the container 101, whereas the interior structure 108 defines the interior decorative and functional features of the container 101. The container 101 may be comprised of a bottom wall 102, a front wall 103 a back wall 104, a first side wall 105, and a second side wall 106, all of which are connected to form the container 101, and in which each respective wall has both interior and exterior characteristics. Alternatively, the container 101 can be of any shape (such as a round, oval, square, etc.) and size with an open top side.

Figure 4:
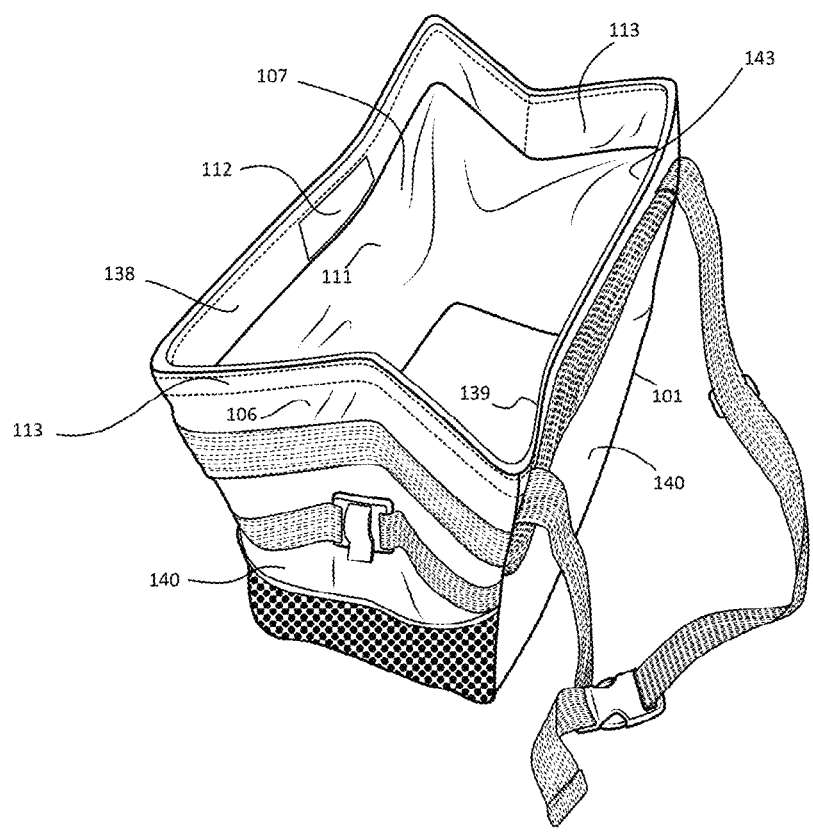
FIG. 4 is a top perspective view of a receptacle having an open top side according to one embodiment of the disclosure.

The interior structure 107 may include an upper fastener portion 109 and a lower lining portion 110. In an exemplary embodiment of the disclosure, the interior structure portion 107 may include a closure mechanism 112 (such as hook and loop, zipper, hook and eye, snaps, magnets, magnetic snaps, buttons, etc.) along its upper fastener portion 109. The upper fastener portion 109 of the front wall 103 and the back wall 104 are reinforced by plastic inserts to create sturdy, yet flexible, upper portions for which closure mechanisms 112 may be integrated. The first side wall 105 and the second side wall 106 are comprised of foldable reinforced side rims 113 along the upper portion of the container 101. In the example, to allow an external user of the receptacle 100 to close the open top of container 143 (as shown in FIG. 4) by merely bringing the front wall 103 and the back wall 104 together of which both walls have a closure mechanism 112 attached to their interior rim portion. Alternative means are known in the art which may be utilized to close the open top of container 143 (as shown in FIG. 4), and FIG. 1 provides an exemplary embodiment of one such configuration.

The lining 110 of the interior structure 107 may be comprised of a leak proof interior liner 111 permanently affixed to the interior structure, the lining may begin below the reinforced front wall rim 138 and the reinforced back wall rim 139 which may be arranged along the upper portion of the container 101. A leak proof interior liner 111 is used to either as a primary or secondary measure used by the user to maintain a barrier between the solids and liquids which may be inserted into the interior structure 107 from interfering with the container 101.

The exterior structure 108 of the container 101 may comprise a perimeter decorative sewed strap 114 along the entire or substantial perimeter of the exterior structure 108 both for aesthetics and functional purposes of hiding sewing lines. There may be rigid rectangular inserts near the upper rim of the container 101 to provide structure, and pockets must be sewed to hold them in place. Moreover, the perimeter decorative sewed strap 114 covers up the sewing needed to affix the short strap 118 and the long strap 119 along the back wall 104. In an alternative embodiment, the decorative sewed strap 114 may be sewed along the front wall 103 and the back wall 104, but may be un-sewed or partially sewed along the edges, but un-sewed along the center portions of the first side wall 105 or second side wall 106 in order to permit attachment of a fastener means 123. One of the prominent features of the receptacle 100 is the hanging strap 115 which allows a user to loop the hanging strap 115 along a fixed item (not show) to keep the bin in an upright position. In one embodiment of the disclosure, the handing strap 115 may be wrapped around a headrest of a passenger side seat, facing the back seats, and provided for trash disposal of items found in the back seat by other passengers traveling in the back of the vehicle. The hanging strap 115 may be comprised of a long strap 116 having a strap of reasonable length to accommodate versatile usage and a short strap 118 having a strap of shorter length used to merely fine tune length adjustments as needed. The long strap 116 may be comprised of a long strap fixed end 144 attached to the container 101, a length adjustment harness 117 in-between both ends, and a long strap buckle-end 119 commencing with either a female or male buck configuration intended to inter-connect with the short strap buckle end 120. The length adjustment harness 117 is used to adjust the length of the long strap 116 to being longer or shorter to fit a variety of different waste receptacle placement positions within a vehicle or anywhere. The short strap 118 may be comprised of a short strap fixed end 145 attached to the container 101 and a short strap buckle end 120. The short strap buckle end 120 may comprise an integrated length adjustment harness 121 built into the buckle end, to allow the user to adjust the short strap length as desired. As stated earlier, the long strap 116 and the short strap 118 can be inter-connected by connecting their respective buckle ends with one another to form a uniform single strap attached to the back wall 104 of the exterior structure 108.

The first side wall 105 and the second side wall 106 may comprise side decorative sewed strap 122 which serves a functional intent of maintaining a fastener means 123 into position. the sewed strap 122 may be completely sewed, partially sewed along the edges, or non-sewed along the first side wall 105 or the second side wall 106. The fastener means 123 may be threaded, sewed, or integrated into the side decorative sewed strap 122. The fastener means 122 may be attached to the sewed strap 122 or the perimeter decorative sewed strap 122 by means of a fastener means harness 222 which allows the integration of two separate straps initiating from opposite ends to meet at a mid-point where the fastener harness 123 is integrated, wherein each separate strap is attached to a fixed edge of the container 101 and a fastener harness 123 end along the mid-point. The fastener means 123 may be arranged along the midpoint of the first side wall 105 or second side wall 106. Also contemplated, that a clasp means 123 is not secured into position using a side decorative sewed strap 122, but rather adhered or integrated into the first side wall 105 and second side wall 106 directly. In one embodiment of the disclosure, the side decorative sewed strap 122 threads a fastener means 123 into the side decorative sewed strap 122. In another embodiment, the fastener means 123 may be configured along the front wall 103 or the back wall 104 rather than the first side wall 105 or the second side wall 106. In another embodiment, the fastener means 123 has an integrated harness having two loops on opposite sides of the fastener means 123 for which the side decorative sewed strap 122 is threaded through one loop into the other to secure the fastener means 123 into a fixed position without permanent physical adhesion to the exterior structure 108. The fastener means may be attached to the exterior structure 108 of the soft-sided container 101 or integrated into the side decorative sewed strap 122. The fastener means may include, but are not limited to a hook, clip, s-hook, c-hook, lobster claw hook, hook clip, quick link, spring clip, magnetic clasp, cleat, cleat hitch, latch, etc.

The first side wall 105 and the second side wall 106 may comprise a see-through mesh pocket 124 to maintain extra exterior liners 130 intended for future use. The mesh pocket 124 may be stitched into the lower corners of the first side wall 105 or the second side wall 106.

Figure 2:
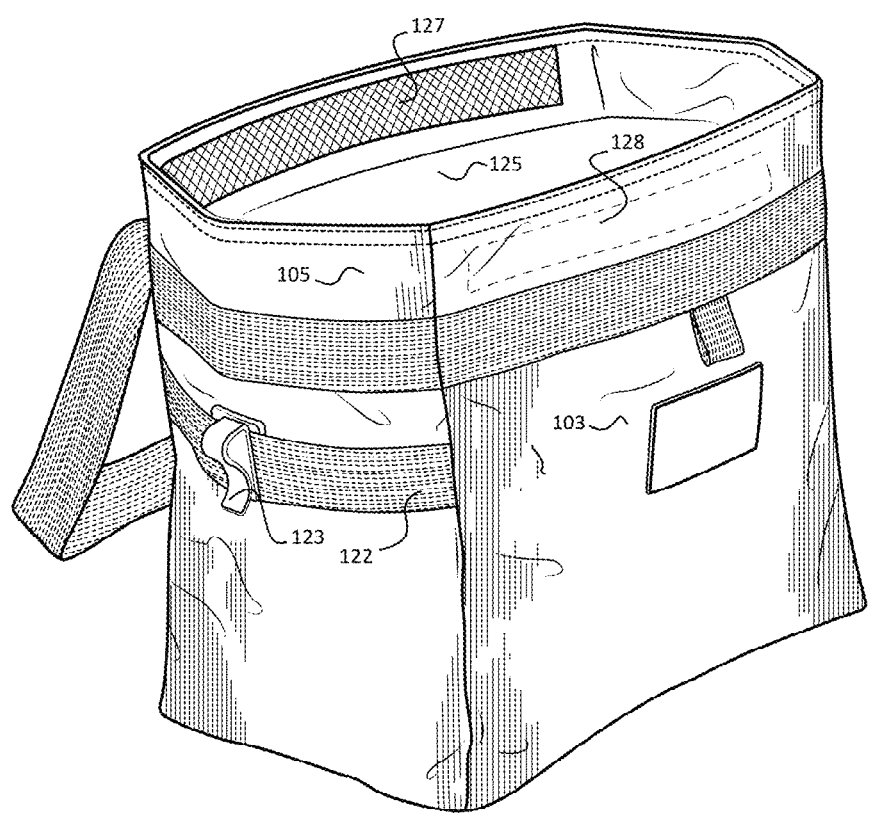
FIG. 2 is a front perspective view of a receptacle according to one embodiment of the disclosure.

FIG. 2 is a front perspective view of a receptacle according to one embodiment of the disclosure. The container 101 is comprised of thermal insulation 125 along its respective walls to allow the container 101 to maintain a preferred temperature of items, such as food products stored within the container 101. The container 101 may comprise a first loop and hook strip 127 and a second loop and hook strip 128 to allow the container 101 to close efficiently. The container 101 may comprise a front wall 103 where a product logo may be shown to the consumer. FIG. 2 provides a front view of the receptacle 100 as shown in FIG. 1. The first side wall 105, as shown in FIG. 2, illustrates the integration of side decorative sewed strap 122 and a fastener means 123.

Figure 3A:
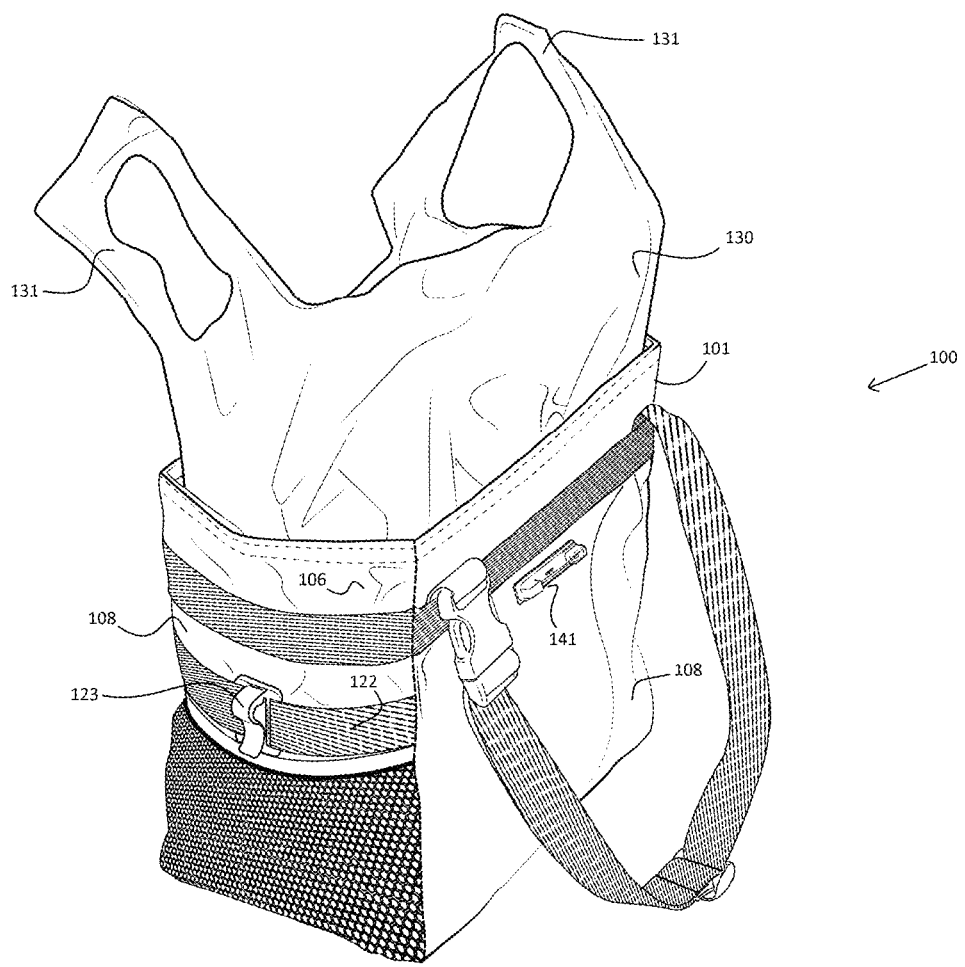
FIG. 3a is a back perspective view of a receptacle including a disposable liner according to one embodiment of the disclosure.

FIG. 3a illustrates a back perspective view of a receptacle 100 including a disposable liner. In one embodiment of the disclosure, at least two fastener means 123 intended to hold the liner handle(s) 131 of an external liner 130 are attached to the exterior structure 108 of the container 101. In an alternative embodiment of the disclosure, at least two fastener means 123 intended to hold the liner handles(s) 131 of an external liner 130 within the interior structure may be attached to the exterior structure 108 of the container 101 on opposite ends. The placement of the fastener means 123 may be on opposite ends of the container 101 to reinforce the liner handle(s) 131 for a more secure attachment.

Alternative means to secure the receptacle 100 within the vehicle or any suitable location includes the use of a stick-on safety pin 141. Using a stick-on safety pin 141, the adhesive portion of the stick-on safety pin 141 may be placed along any exterior wall along the exterior structure 108 and the safety pin portion attaching to an exterior miscellaneous item, such as a seat cushion, car seat, car seat cover, blanket, etc. In second side wall 106 may comprise a side decorative sewed strap 122 integrated with a fastener means 123.

Additionally, another alternative means to secure the receptacle 100 within the vehicle, or any suitable location includes the use of stick-on loop and hooks strips. In the example, the first loop & hook strip (not shown) may be affixed to the bottom of the receptacle 100 and the complementary second loop & hook strip (not shown) may be affixed to an exterior miscellaneous item, such as a car seat, blanket, car seat cover, plastic surface, etc.

Finally, the more preferred method of securely maintain the receptacle 100 in an upright and sturdy position includes the use of the integrated hanging strap 115 which allows for length adjustment and versatility to allow the receptacle 100 to fit into a plurality of locations both inside vehicles or inside homes/business.

Figure 3B:
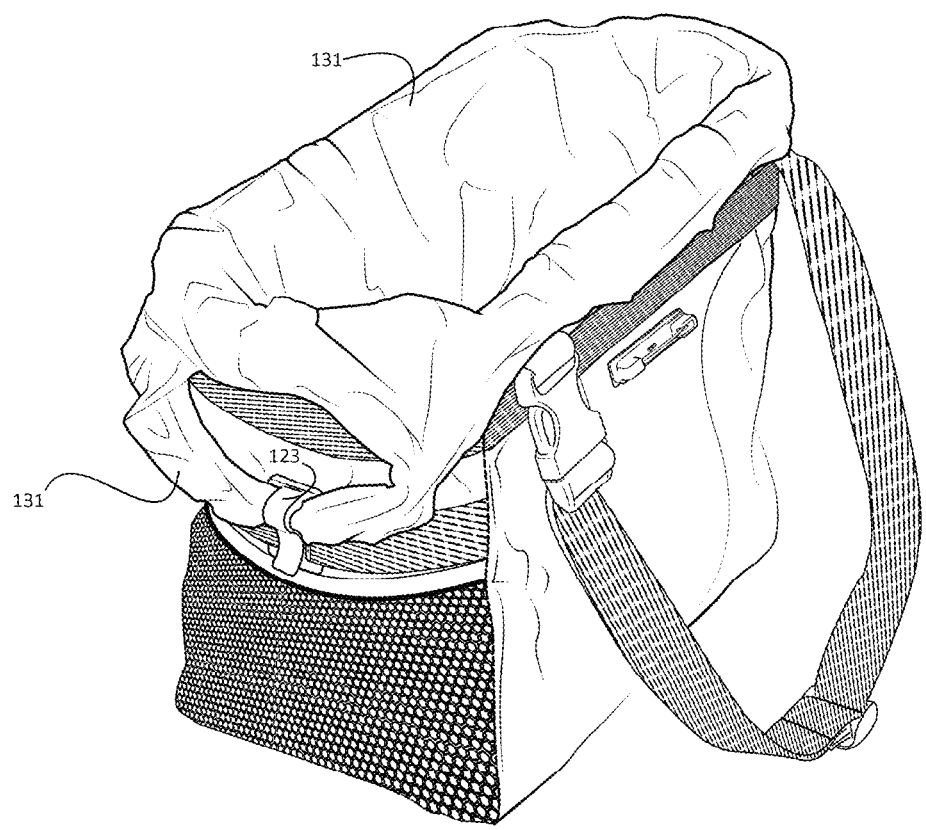
FIG. 3b is a back perspective view of a receptacle including a disposable liner attached to a fastener means according to one embodiment of the disclosure.

FIG. 3b illustrates a back perspective view of a receptacle 100 including a disposable liner 130 attached to a fastener means 123. In one embodiment, at least one fastener means 123 intended to hold liner handle(s) 131 (as shown in FIG. 3a) of an external liner 130 is attached to the exterior structure 108 of the container 101 (as shown and described in FIG. 1). As can be shown in FIG. 3b, the disposable liner 130 is securely attached to the fastener means 123 on opposite ends. In another embodiment, a receptacle 100 may comprise a single fastener means 123 and a disposable liner configured for synching, wherein the disposable liner is synched along the top of the receptacle 100, and a single fastener means 123 is necessary to maintain the disposable liner 130 in a secure and fixed position during use.

Figure 5:
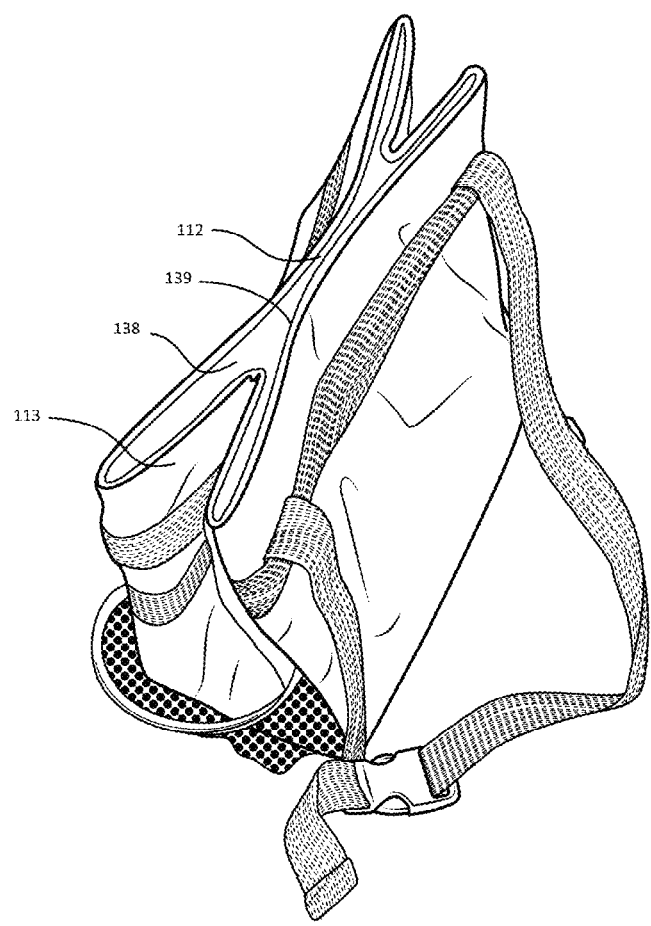
FIG. 5 is a top perspective view of a receptacle having a collapsed closed top side according to one embodiment of the disclosure.
Figure 6:
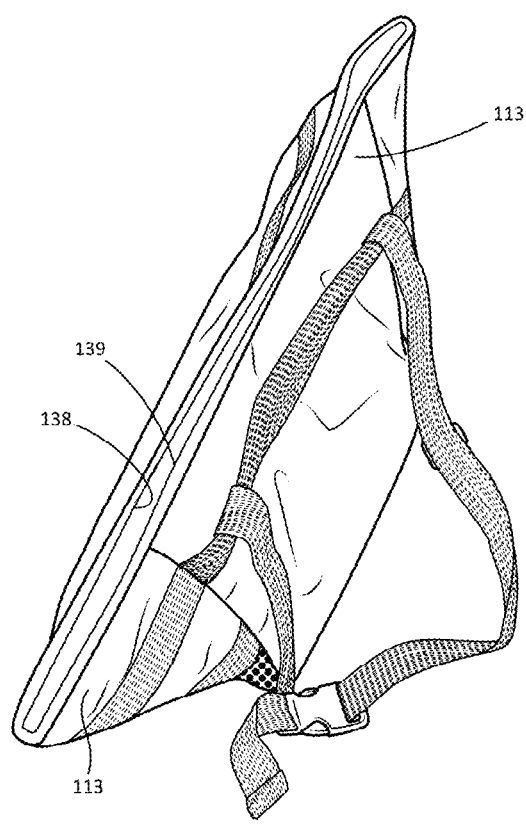
FIG. 6 is a top perspective view of a receptacle having an expanded closed top side according to one embodiment of the disclosure.

FIG. 4 is an illustrative top perspective view of a receptacle 100 having an open top side. The container 101 having an open top of container 143 having a soft-sided exterior lining 140 along the perimeter of the container 101. The container 101 may comprise an interior structure 107 having a leak proof interior lining 111 along the lower portion and a closure mechanism 112 along the top portion. The container 101 may further comprise foldable reinforced side rims 113 permits a user to either fold the side rims 113 inward or outward. This functionality serves to allow the user to expand the size of the container 101 by folding the side rims 113 in an outward "V" shape (as shown in FIG. 6) or reduce the size of the container 101 by folding the side rims 113 in an inward "V" shape (as shown in FIG. 5). Moreover, the side rims 113 are typically engaged by a user when a user is interested in closing the open top of container 143 within the container 101. For example, before bringing the reinforced front wall rim 138 and the reinforced back wall rim 139 together for closure, the user will either fold the side rims 113 inward or outward. Moreover, the user may elect to have one side rim 113 configured inward and allow the opposite side rim 113 to be configured outward.

FIG. 5 is a top perspective view of a receptacle 100 having a collapsed closed top side according to one embodiment of the disclosure. Accordingly, by folding the side rims 113 in an inward "V" shape, the receptacle available volume is reduced in size resulting in an overall reduction of the size of the container 101. In one embodiment, the receptacle having foldable side rims 113 on opposite ends, permits for the bringing together of reinforced front wall rim 138 and the reinforced back wall rim 139 to permit for the closure mechanism 112 integrated into the receptacle 100 to permit the closure of the container 101.

FIG. 6 is a top perspective view of a receptacle having an expanded closed top side according to one embodiment of the disclosure. Accordingly, by folding the side rims 113 in an outward "V" shape, the receptacle shape is adjusted from its original shape as shown in FIG. 4. In one embodiment, the receptacle having foldable side rims 113 on opposite ends, permits for the bringing together of reinforced front wall rim 138 and the reinforced back wall rim 139 to permit for the closure mechanism 112 integrated into the receptacle 100 to permit the closure of the container 101.

Figure 7:
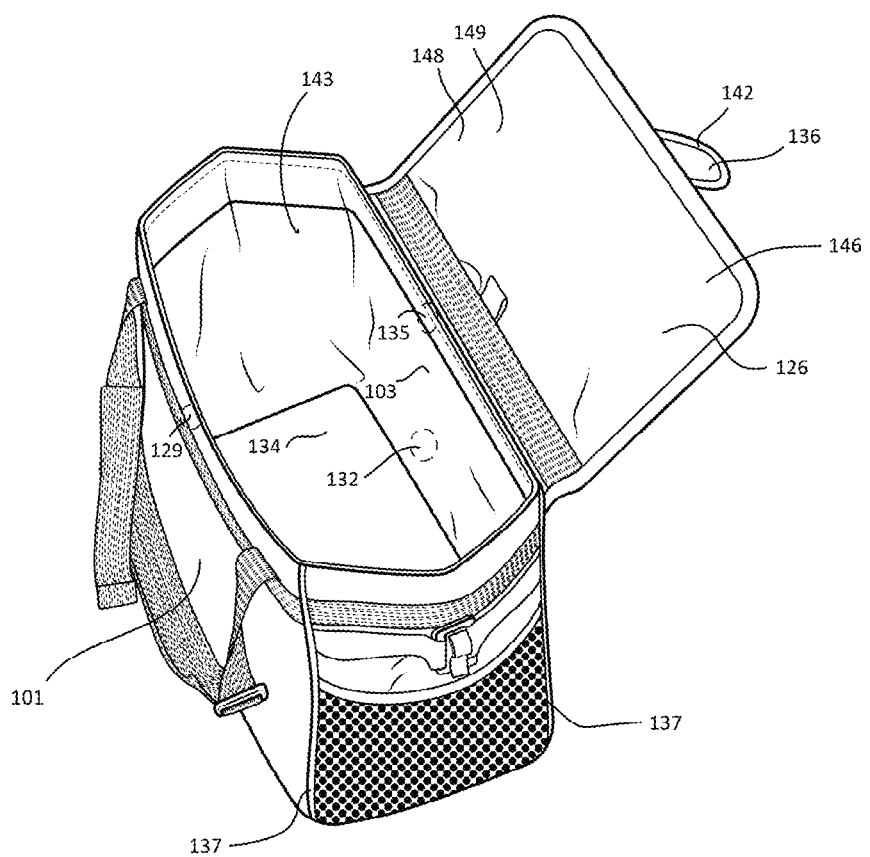
FIG. 7 is a top perspective view of a receptacle having an open lid according to one embodiment of the disclosure.
Figure 8:
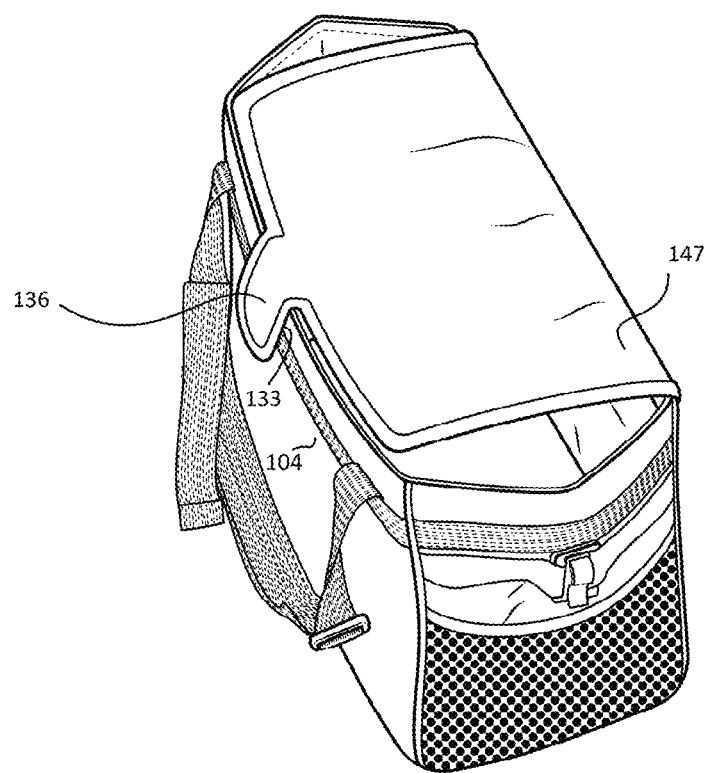
FIG. 8 is a top perspective view of a receptacle having a closed lid according to one embodiment of the disclosure.

FIG. 7 is a top perspective view of a receptacle having an open lid according to one embodiment of the disclosure. In one embodiment of the disclosure, the receptacle 100 may include a lid 126 to cover the open top of container 143 of the container 101 and additionally, include a lid clasp 129 (such as a magnetic clasp) to keep the lid closed more securely. In one embodiment of the disclosure, the front wall 103 may be permanently attached to a lid 126 having a lid front side 146 and a lid back side 147 (as shown in FIG. 8) an interior lid pocket 148 having rigid plastic wall 149 inserted therein to form a sturdy lid 126. Moreover, along the side opposite to where the lid 126 is permanently attached to the front wall 103 exists a lid tab 142 having a magnetic material placed inside of the lid tab 142, hereafter referred to as magnet tab 136. The magnet tab 136 may be magnetically attracted to a front lower magnet 132 along the front wall 103 while the lid 126 is in an open position. The lid clasp 129 may be magnetically attracted to back upper iron piece 135 to permit the closure of the container 101 without the use of the lid 126.

In an alternative embodiment of the disclosure, the receptacle 100 may be of an extra-large size and may require rigid spines 137 integrated along its outer perimeter and a stiff bottom plate 134 along the bottom of the receptacle 100 to maintain its shape with the added weight of a lid 126 placed along the open top of container 143 of the container 101. In one embodiment, the receptacle 100 may be of a rectangular size and dimensions wherein the rigid spines 137 can be integrated into a vertical orientation along the four corners of the container 101 to maintain structural support.

FIG. 8 is a top perspective view of a receptacle 100 having a closed lid 126 according to one embodiment of the disclosure. The magnet tab 136 may be magnetically attracted to a back upper magnet 133 along the back wall 104 while the lid is in a closed (i.e. flipped over) position.

Figure 9:
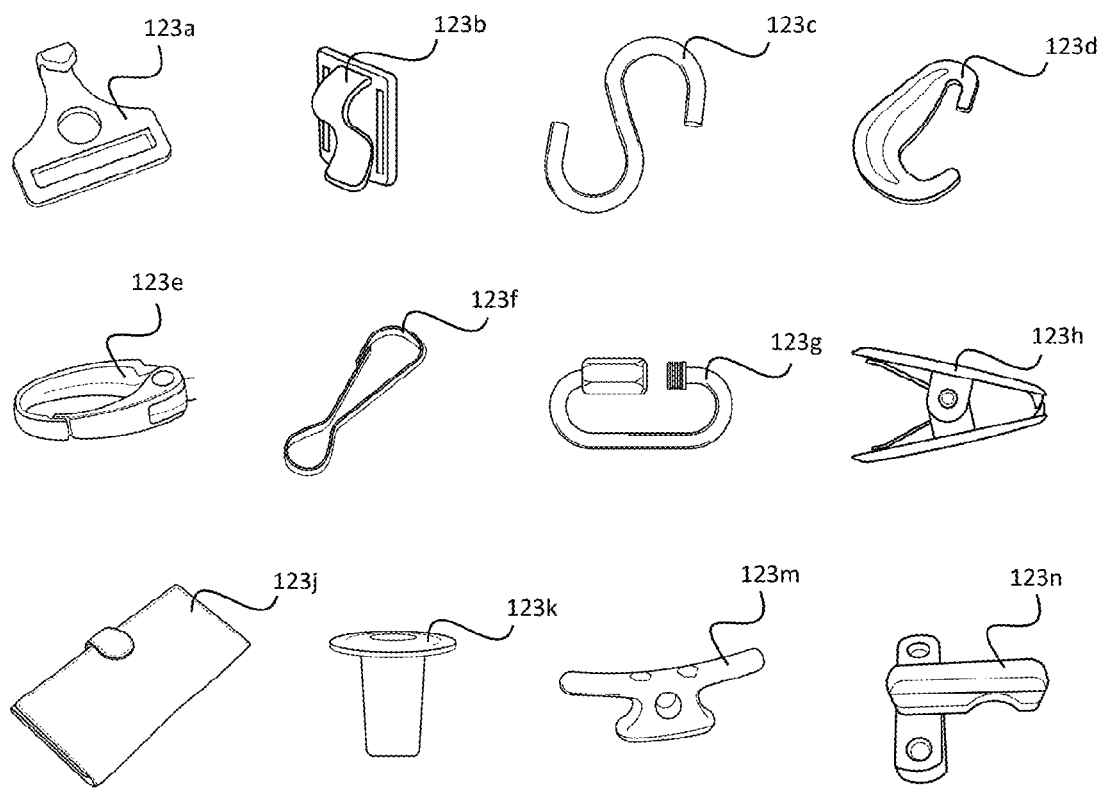
FIG. 9 is an illustration of a plurality of fastener means which may be configured along the exterior structure of the container.

FIG. 9 is an illustration of a plurality of fastener means 123 which may be configured along the exterior structure of the container 101. The fastener means 123 provided in FIG. 9 is not an exhaustive list of all the different fastener means available, but rather are illustrative of the differing fastener means 123 which may be incorporated into the scope of the disclosure. As shown in FIG. 9 fastener means 123a may be a general purpose hook, or downward facing hook, or the like. As shown in FIG. 9 fastener means 123b is a general purpose clip, or a downward facing clip, or the like, which may require pressure to insert a liner handle 131 (as shown in FIG. 3b) into a secure position. As shown in FIG. 9 fastener means 123c is a general purpose S-hook. As shown in FIG. 9 fastener means 123d is a general purpose C-hook. As shown in FIG. 9 fastener means 123e is a general purpose lobster clip, safety hook clip, or the like. As shown in FIG. 9 fastener means 123f is a general purpose safety pin clip or the like. As shown in FIG. 9 fastener means 123g is a general purpose quick link, safety hook, or the like. As shown in FIG. 9 fastener means 123h is a general purpose spring clip or the like. As shown in FIG. 9 fastener means 123j is a general purpose magnetic clasp or the like. As shown in FIG. 9 fastener means 123k is a general purpose cleat. As shown in FIG. 9 fastener means 123m is a general purpose cleat hitch. As shown in FIG. 9 fastener means 123n is a general purpose latch.

Figure 10A:
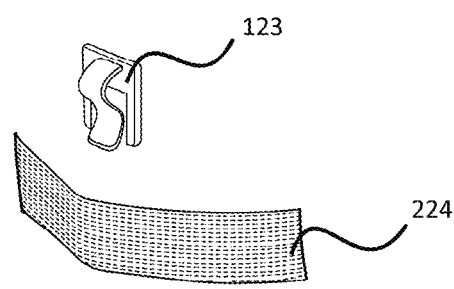
FIG. 10A is an illustration of a removable fastener means in accordance with one embodiment of the disclosure.

FIG. 10A is an illustration of a removable fastener means 123. In one embodiment, the fastener means 123 may be removable, allowing for a fastener means 123 to be clipped into position or removed entirely from a decorative strap 224.

Figure 10B:
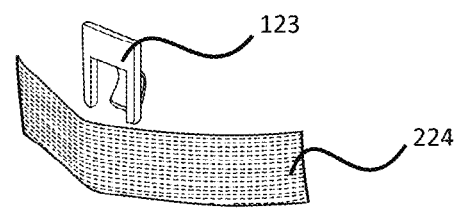
FIG. 10B is an illustration of a rotatable fastener means in accordance with one embodiment of the disclosure.

FIG. 10B is an illustration of a rotatable fastener means 123. In accordance with one embodiment of the disclosure, the fastener means 123 may be rotatable, allowing for the fastener means 123 to be rotatable positioned facing inward, rather than outward along the decorative strap 224.

Figure 10C:
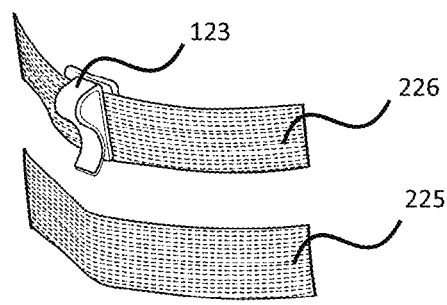
FIG. 10C is an illustration of a height adjustment fastener means in accordance with one embodiment of the disclosure.

FIG. 10C is an illustration of a height adjustment fastener 123 means. In accordance with one embodiment of the disclosure, the receptacle 100 may comprise a top decorative strap 226 and lower decorative strap 225 and the fastener means may be removable to permit for height adjustment, whereby the fastener means 123 may be removable by the user, and configured along the top decorative strap 226 as shown in FIG. 10C or along the lower decorative strap 225, at the user's choosing.

Figure 11:
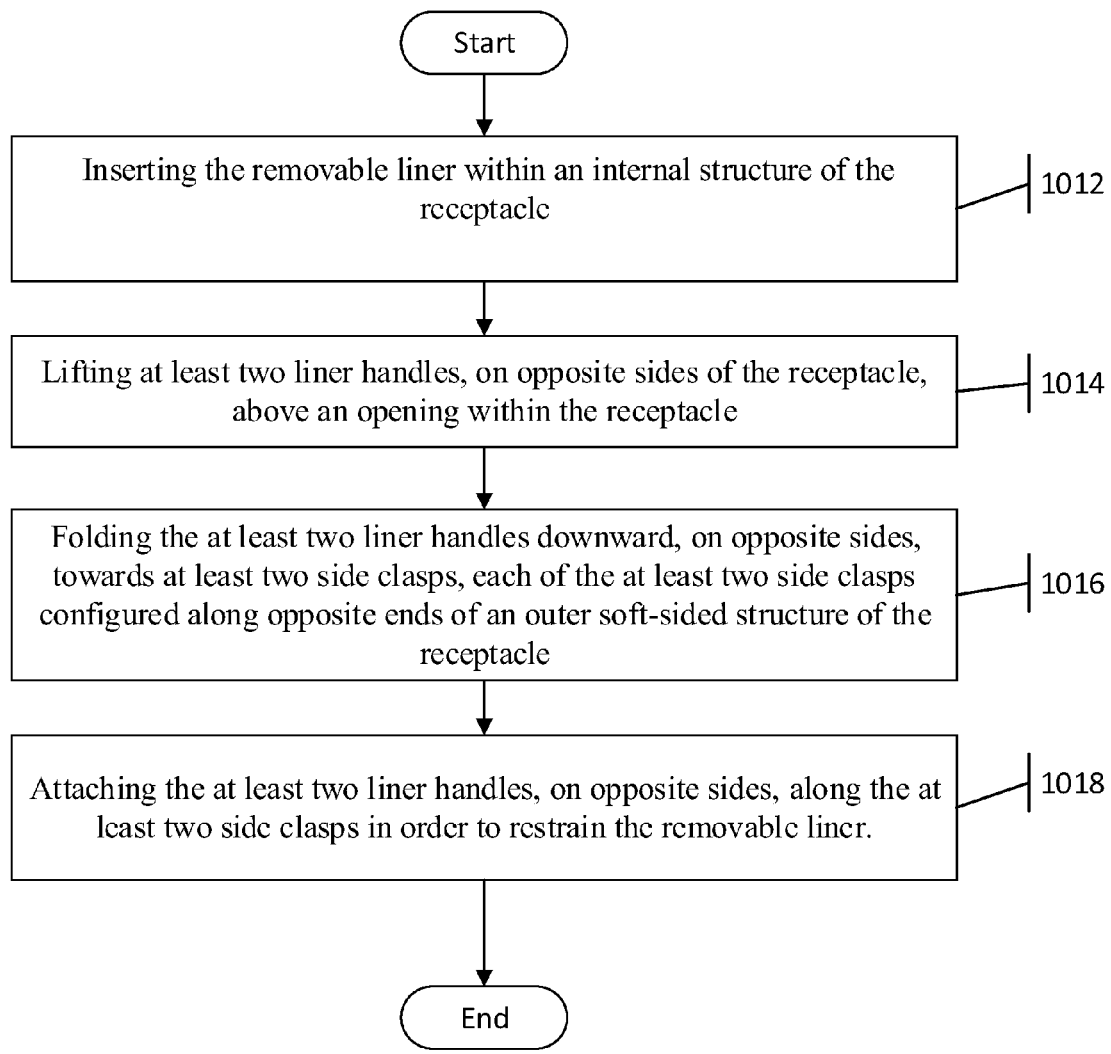
FIG. 11 is a diagram illustrating the method of restraining a removable liner within a soft-sided receptacle.

FIG. 11 is a diagram illustrating the method of restraining a removable liner within a soft-sided receptacle. The process begins at in Step 1012, inserting the removable external liner within an internal structure of the receptacle. In one embodiment, the user may insert the disposable nylon liner into the inner portion of the receptacle. After insertion of the liner, the process continues to Step 1014. In Step 1014, lifting at least two liner handles, on opposite sides of the receptacle, above an opening within the receptacle. In one embodiment, the user may begin to lift the liner handles, at least two on opposite ends, above the opening of the receptacle. After lifting of the two liner handles, the process continues to Step 1016. In Step 1016, folding the at least two liner handles downward, on opposite sides, towards at least two side clasps, each of the at least two side clasps configured along opposite ends of an outer soft-sided structure of the receptacle. After folding the liner handles, the process concludes with Step 1018. In Step 1018, attaching the at least two liner handles, on opposite sides, along the at least two side clasps in order to restrain the removable liner.

Although this invention has been described in terms of certain preferred embodiments, other embodiments that are apparent to those of ordinary skill in the art, including embodiment which do not provide all of the benefits and features set forth herein, are also within the scope of the invention. Accordingly, the scope of the invention is defined only by reference to the appended claims.

What is claimed is:
1. A receptacle to restrain a disposable liner, comprising:
   a soft-sided open top container, comprising:
      an interior structure and an exterior structure;
   the interior structure, comprising:
      a leak proof permanently affixed liner;
   the exterior structure, comprising:
      two fastener means, each of which is attached at opposite ends of the exterior structure to secure at least two disposable liner handles of the disposable liner;
      wherein the exterior structure having a side decorative sewed strap on opposite sides of the container comprising at least one of the two fastener means threaded into the side decorative sewed strap along its midpoint;
      wherein the at least one of the two fastener means is a clasp that is adapted to attach to a corresponding clasp permanently affixed along the exterior structure.
2. A receptacle, comprising:
   a soft-sided open top container, comprising:
      an interior structure and an exterior structure;
   the interior structure, comprising:
      a leak proof permanently affixed liner;
   the exterior structure, comprising:
      two opposite sides, each of the two sides comprising a horizontal strap extending an entire width of the side and sewn into the exterior structure of the receptacle except at the midpoint, which includes a fastener means that is adapted to attach to the strap;
      wherein the fastener means is a downward facing hook.

3. A receptacle, comprising:
a soft-sided open top container, comprising:
  an interior structure and an exterior structure;
the interior structure, comprising:
  a leak proof permanently affixed liner;
the exterior structure, comprising:
  two opposite sides, each of the two sides comprising a horizontal strap extending an entire width of the side and sewn into the exterior structure of the receptacle except at the midpoint, which includes a fastener means that is adapted to attach to the strap;
  wherein the fastener means is a downward facing clip.

\* \* \* \* \*